UNITED STATES PATENT OFFICE.

HENRY DREYFUS, OF LONDON, ENGLAND.

MANUFACTURE OF SOLUTIONS, PREPARATIONS, OR COMPOSITIONS HAVING A BASIS OF CELLULOSE ACETATE.

1,395,401. Specification of Letters Patent. Patented Nov. 1, 1921.

No Drawing. Application filed August 29, 1919. Serial No. 320,715.

(GRANTED UNDER THE PROVISIONS OF THE ACT OF MARCH 3, 1921, 41 STAT. L., 1313.)

*To all whom it may concern:*

Be it known that I, HENRY DREYFUS, of London, England, have invented certain new and useful Improvements Relating to the Manufacture of Solutions, Preparations, or Compositions Having a Basis of Cellulose Acetate and of Products or Articles Made Therewith, (for which I have filed applications in France on March 4, 1914, and in Great Britain on June 10, 1919,) of which the following is a specification.

The present invention relates to the manufacture of solutions, preparations or compositions having cellulose acetate as a basis, and of celluloid-like masses, films, artificial filaments, insulating materials, or other products or articles of any nature made therewith. Any such solutions, preparations and products are hereinafter included in the term "composition of matter."

In the manufacture hereinbefore referred to, it is usually necessary to employ solvents of high boiling point, the purpose of which is to hold the cellulose acetate in solution after evaporation of the usual volatile solvents or liquids or in the absence of these, and to impart the various degrees of plasticity, plurality, softness and so forth which are requisite or desirable for the particular case or product concerned.

The finding of suitable high boiling solvents for cellulose acetate is a matter of great difficulty because of the numerous special properties which such solvent should possess in order to be suitable for employment for the purposes above indicated.

Firstly the substance must be a true solvent of cellulose acetate, so that it retains the latter permanently in solution after evaporation of the volatile solvents or diluents which are usually also employed in making the films, threads, coatings, plastic masses, celluloids and so forth. Further, it should be neutral, *i. e.* neither acid nor alkaline in character, nor liable to become so under the effect of atmospheric influences, and it should be stable, resistant to saponification, and insoluble or practically insoluble in water.

Moreover owing to the peculiar and special character of cellulose acetates relatively to other cellulose esters, and in particular to nitro cellulose, substances which will dissolve these latter are frequently found to be no solvents for cellulose acetates and even to precipitate the same.

Now I have found that the cyclo-hexanones, that is to say, ketohexamethylene, and its homologues, such as methyl-cyclo-hexanone, any desirable cyclo-hexanone, are excellent solvents for cellulose acetate. This fact is the more surprising inasmuch as cyclo-hexanone acetate has no solvent power for the acetates of cellulose that are readily soluble in the usual organic solvents thereof, and moveover inasmuch as cyclo-hexanol only dissolves cellulose acetates on heating, the cellulose acetate coming out of solution again in the cold.

The said solvents may be employed either one or more alone, or in any mixture with each other, or together with usual or suitable volatile diluents or solvents, such as methyl- or ethyl-alcohol, acetone, methyl acetate and so forth. Naturally any other known or suitable liquids, solvents, plastifying agents or other substances can be added or employed in making the solution, composition or preparation.

The proportions of the solvents of the present invention can of course vary greatly according to the character, degree of hardness or softness, pliability and so forth of the coating, film, sheet, thread, celluloid or other ultimate product to be obtained, and to the nature of the other constituents of the solution or composition made.

What I claim and desire to secure by Letters Patent is:—

1. A composition of matter containing cellulose acetate and a cyclo-hexanone.

2. A composition of matter containing cellulose acetate and ketohexamethylene.

In testimony whereof I have hereunto subscribed my name.

HENRY DREYFUS.